United States Patent [19]

Zones et al.

[11] Patent Number: 5,340,563

[45] Date of Patent: * Aug. 23, 1994

[54] PREPARATION OF ZEOLITES USING LOW SILICA/ALUMINA ZEOLITES AS A SOURCE OF ALUMINUM

[75] Inventors: Stacey I. Zones, San Francisco; Yumi Nakagawa, Kensington, both of Calif.

[73] Assignee: Chevron Research and Technology Company, San Francisco, Calif.

[*] Notice: The portion of the term of this patent subsequent to Jul. 6, 2010 has been disclaimed.

[21] Appl. No.: 908,680

[22] Filed: Jun. 30, 1992

[51] Int. Cl.$^5$ ............................................. C01B 33/26
[52] U.S. Cl. ..................... 423/706; 423/328.2; 423/716; 502/64
[58] Field of Search ............... 423/706, 712, 716, 717, 423/328.2; 502/64

[56] References Cited

U.S. PATENT DOCUMENTS

| | | | |
|---|---|---|---|
| 3,733,390 | 5/1973 | Robson | 423/712 |
| 4,247,524 | 1/1981 | Leonard | 423/712 |
| 4,401,633 | 8/1983 | Sun | 423/712 |
| 5,166,107 | 11/1992 | Taga et al. | 423/717 |
| 5,225,179 | 7/1993 | Zones et al. | 423/709 |

FOREIGN PATENT DOCUMENTS

| | | | |
|---|---|---|---|
| 2524458 | 10/1983 | France | 423/716 |
| 91-15427 | 10/1991 | PCT Int'l Appl. | 423/716 |

OTHER PUBLICATIONS

Barrer et al. "Molecular Sieve Sorbents from Clinoptilolite" Can. J. Chem. vol. 42 1964 pp. 1481–1487.
Lok et al. "The Role of Organic Molecules in Molecular Sieve Synthesis" Zeolites vol. 3, 1983 pp. 282–291.

*Primary Examiner*—Anthony McFarlane
*Attorney, Agent, or Firm*—W. K. Turner; R. J. Sheridan

[57] ABSTRACT

An improved method of synthesizing large pore zeolites is disclosed and claimed. The method comprises preparing a reaction mixture containing a source zeolite on alkali metal, nitrogen containing organic cation, a source of silica, and water, and having the following composition in terms of the mole ratios:

$$M^+/SiO_2 = 0.01–1.00$$
$$OH^-/SiO_2 = 0.15–0.80$$
$$H_2O/SiO_2 = 20–120$$
$$Q/SiO_2 = 0.10–1.00$$
$$SiO_2/Y_2O_3 = \text{Greater Than 8}$$

wherein $M^+$ is an alkali metal not supplied by the source zeolite, Q is an organic template, and Y is a mixture of aluminum from the source zeolite, wherein said source zeolite contains soda lite substructures having tetrahedra atom densities of less than about 15 $TO_2$ per 1000 Å$^3$; maintaining the reaction mixture at crystallization temperature until crystals are formed; and recovering the crystals.

14 Claims, No Drawings

PREPARATION OF ZEOLITES USING LOW SILICA/ALUMINA ZEOLITES AS A SOURCE OF ALUMINUM

FIELD OF THE INVENTION

The present invention relates to an improved method for the preparation of crystalline large pore aluminosilicate zeolites. More particularly, the aluminosilicate zeolites are prepared from reaction formulations that use as the alumina source zeolitic aluminosilicates having sodalite substructures and that have a tetrahedra atom density of less than about 15 $TO_2$ per 1000 $Å^3$.

BACKGROUND OF THE INVENTION

Zeolite materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of smaller cavities which may be interconnected by a number of still smaller channels. Since the dimensions of these pores are such as to accept for adsorption molecules of certain dimensions while rejecting those of larger dimensions, these materials have come to be known as "molecular sieve" and are further being used as catalysts or supports for catalysts for the conversion of compounds, for example, in hydrocarbon cracking, alkylation or isomerization reactions.

These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, alkali metal or an alkaline earth metal cation. This can be expressed wherein the ratio of aluminum to the number or various cations, such as Ca, Sr, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selections of the cation.

The remarkable properties of zeolites have led to the development of processes for the production of synthetic zeolites. There are many synthetic zeolites and they form the subject matter of many patents and publications. Non-limiting examples of such synthetic zeolites include A (U.S. Pat. No. 2,882,243), X (U.S. Pat. No. 2,882,244), LZ-210 (U.S. Pat. No. 4,503,023), SSZ-12 (U.S. Pat. No. 4,544,538), SSZ-16 (U.S. Pat. No. 4,508,837, Nu-3 (U.S. Pat. No. 4,372,930).

Generally, crystalline silicate zeolites are synthesized by preparing a solution containing sources of an alkali metal oxide, a nitrogen-containing cations (also known as an organic template), an oxide of aluminum, an oxide of silicon, and water. Then, under well defined operating conditions and with specific ratios between the precursors of the zeolites, crystallizing the desired zeolite.

While crystalline components are generally not good reagents in zeolite synthesis, owing to their resistance to breakdown and transformation, occasionally there are exceptional materials which turn out to be very useful reactants. This may come as a result of such features as very high surface area for the crystalline material, or there may be an unusual inherent instability in the crystal. Very small crystal size can also be a helpful feature.

It was previously shown in U.S. Pat. No. 4,689,207 that a crystalline silica, Magadiite was a useful reactant for high silica zeolite synthesis. U.S. Pat. No. 4,503,024 also discloses a method of preparing chabazite, merlinoite, edingtonite, ZSM-5, and ZSM-11 from the natural and synthetic zeolites mordenite, ferrierite, clinoptilolite, zeolite X and zeolite Y.

For a given zeolite structure it is not always possible to prepare the zeolite over a wide $SiO_2/Al_2O_3$ compositional range. While the zeolite is largely composed of $SiO_2$, it is the substitution of aluminum for silica which imparts acid characteristics to the zeolites.

It has been demonstrated by Barthomeuf (J. Phys Chem. 1984 pg 42) that the maximum zeolitic acidity is obtained when the $SiO_2/Al_2O_3$ molar ratio is from 12-18. In general, zeolites with $SiO_2/Al_2O_3$ of 10-20 are catalytically more active than zeolites with values on either side of this ratio. In attempting to modify the $SiO_2/Al_2O_3$ molar ratio to a desired range, the prior art teaches several methods for replacing framework aluminum. These methods largely comprise techniques where alumina is removed from the crystalline zeolite structure thereby reducing the acidity of the zeolite. U.S. Pat. No. 5,098,687 discloses a process for removing framework aluminum from zeolites and substituting iron and/or titanium. Other methods include ion exchanging the aluminum using acid or bases or combinations of both methods.

Examples of the above methods include: U.S. Pat. No. 3,620,960 (treatment of the zeolite with molybdenum fluoride); U.S. Pat. No. 3,630,965 (treatment of the zeolite with hydrofluoric acid); U.S. Pat. No. 3,644,220 (treatment of the zeolite with volatile halides selected from the group consisting of aluminum, zirconium, titanium, tin, molybdenum, tungsten, chromium, vanadium, antimony, bismuth, iron, platinum group metals and rare earths); U.S. Pat. No. 3,575,887 and U.S. Pat. No. 3,702,312 (treatment of the zeolite with fluorides and chlorides).

Applicants have now unexpectedly discovered that it is possible to prepare a reaction mixture so that optimum $SiO_2/Al_2O_3$ is incorporated into the zeolite without resorting to subsequent process steps.

It is an object of the invention to provide a method whereby zeolites having $SiO_2/Al_2O_3$ molar ratio less than about may be prepared. It is another object of the invention to prove a method for preparing zeolites whereby crystallization time is substantially reduced as compared to conventional prior art methods utilized. It is still another object of the invention to provide a reproducible method for preparing well crystallized zeolites.

We have discovered that faujasitic structures with $SiO_2/Al_2O_3$ values in the 2 to 20 range, make excellent aluminum sources in zeolite syntheses toward attaining this maximum acidity. In addition these faujasitic materials can often lead to novel zeolites which could not be made when using the methods taught by the prior art.

SUMMARY OF THE INVENTION

The present invention is directed to a method of preparing aluminosilicate zeolites, the method comprises preparing a reaction mixture containing a source zeolite, preferably the sodium or ammonium form of the source zeolite, wherein said source zeolite contains sodalite substructures and has a tetrahedra atom density of less than about 15 $TO_2$ per 1000 $Å^3$, an alkali metal oxide, an organic template, a source of silica, and water, and having the following composition, in terms of mole ratios:

| | |
|---|---|
| $M^+/SiO_2$ | = 0.01–1.00 |
| $OH^-/SiO_2$ | = 0.15–0.80 |
| $H_2O/SiO_2$ | = 20–120 |
| $Q/SiO_2$ | = 0.10–1.00 |
| $SiO_2/Y_2O_3$ | = Greater Than 8 | wherein $M^+$ is an alkali metal not supplied by the source zeolite, Q is an organic template, and Y is aluminum from the source zeolite; maintaining said mixture at crystallization temperature until crystals are formed, wherein said crystals have a pore size greater than 7 Å; and recovering said crystals.

Among other factors, the present invention is based on our finding that a zeolite, which has sodalite substructures and has a tetrahedra atom density of less than about 15 $TO_2$ per 1000 $Å^3$, may be used as a reactant in the synthesis of zeolites having a pore size greater than 7 Å. Preferably, the source zeolite is in its alkali form or in the ammonium form. Surprisingly, we have also found that under certain reaction conditions, novel zeolites can only be prepared using this novel approach of using zeolites having the above characteristics as a reactant. For example, SSZ-37 is known to be prepared by using this method. SSZ-37 is described in detail in the copending application Ser. No. 906,919, filed Jun. 30, 1992, now U.S. Pat. No. 5,254,514, the entire disclosure of which is incorporated herein by reference.

DETAILED DESCRIPTION OF THE INVENTION

The present invention is for an improved method of preparing large pore crystalline zeolites. The crystalline zeolites can be prepared from an aqueous solution containing a source zeolite, preferably, the sodium or ammonium form of the zeolite, wherein the source zeolite contains sodalite substructures and has a tetrahedra atom density of less than about 15 $TO_2$ per 1000 $Å^3$, an alkali metal oxide, an organic template, silica, and water. The reaction mixture should have a composition in terms of mole ratios of oxides falling within the following ranges:

| | | Narrow | Broad |
|---|---|---|---|
| $M^+/SiO_2$ | = | 0.20–0.80 | 0.01–1.00 |
| $OH^-/SiO_2$ | = | 0.20–0.80 | 0.20–1.00 |
| $H_2O/SiO_2$ | = | 20–50 | 10–120 |
| $Q/SiO_2$ | = | 0.10–0.25 | 0.1–1.00 |
| $SiO_2/Y_2O_3$ | = | 8–400 | >10 |

Where $M^+$ is an alkali metal not supplied by the source zeolite, preferably sodium or potassium, Q is an organic template, and Y is aluminum supplied by the source zeolite. Optionally, the above reaction mixture may contain an additional source of aluminum not supplied by the zeolite, so that, Y is aluminum from the source zeolite and the other aluminum source.

Crystalline zeolites which can be prepared in accordance with the present invention are those zeolites having a pore size greater than 7 Å. It is also preferred that the crystalline zeolites have a silica to alumina mole ratio less than about 20. More preferably, the crystalline zeolites have a silica to alumina mole ratio from about 10 to less than about 20, and most preferably, a silica to alumina mole ratio from about 14 less than about 20.

The term "large pore" means having a pore size reater than 7 Å. The pore size of the zeolite can be determined by the constraint index, as described in U.S. Pat. No. 4,296,083, the disclosure of which is incorporated by reference. Generally, those zeolites having a pore diameter greater than 7 Å have a constraint index less than 1. Non-limiting examples of zeolites that can be made in accordance with the present invention include SSZ-25, SSZ-31, SSZ-37, Beta, and ZSM-12. Pore size of various zeolites can be found in the Atlas of Zeolite Structure, by W. H. Meier and D. H. Olsen (1989).

Zeolite SSZ-25 and the conventional preparation thereof is described in the copending application having the U.S. Ser. No. 809,652 filed 1991, now abandoned, the entire disclosure of which is incorporated herein by reference.

Zeolite SSZ-31 and the conventional preparation thereof is described in the copending application having the U.S. Ser. No. 817,260 filed 1992, now U.S. Pat. No. 5,215,648, the entire disclosure of which is incorporated herein by reference.

Zeolite SSZ-37 and the conventional preparation thereof is described in copending application having the U.S. Ser. No. 906,919, filed Jun. 30, 1992, now U.S. Pat. No. 5,254,514 the entire disclosure of which is incorporated herein by reference.

Zeolite BETA and the conventional preparation thereof is described in U.S. Pat. No. 3,308,069 and RE. No. 28,341, the entire disclosures of which is incorporated herein by reference.

Zeolite ZSM-and the conventional preparation thereof is described in U.S. Pat. No. 3,832,449, and the disclosure of which is incorporated herein by reference.

It is to be understood that by incorporating by reference the foregoing patents and applications to describe examples of specific members of the zeolites with greater particularity, it is intended that identification of the therein disclosed crystalline zeolites be resolved on the basis of their respective X-ray diffraction patterns. As discussed above, the present invention contemplates preparation of such catalysts wherein the mole ratio of aluminum to silica my be different than disclosed in the patents. The incorporation of the identified patents should therefore not be construed as limiting the disclosed crystalline zeolites to those having the specific aluminum silica mole ratios discussed therein. It is the crystal structure, as identified by the X-ray diffraction "fingerprint," which established the identity of the specific crystalline zeolite material. In some instances, the lattice constants of the above phases my be seen to be enlarged as a result of aluminum incorporation.

The term "source zeolite" used herein means an aluminosilicate used as a reactant in a reaction mixture to produce a targeted product zeolite. The term "product zeolite" used herein means the resulting crystalline zeolite formed from the reaction mixture.

The source zeolite used in accordance with the invention contains sodalite substructures and has a tetrahedra atom density of less than about $TO_2/1000$ $Å^3$. Preferably, the source zeolites are A, N-A, ZK-4, faujasite, X, Y, ZK-5, and rho. Most preferably, the source zeolites are A, X, Y, and 2 rho. The silica to alumina mole ratio of these zeolites should be from about 2 to about 20.

Preferably, the silica to alumina mole ratio of these zeolites should be from about 2 to about 10, and most preferably from about 5 to about 10.

Zeolite A and the conventional preparation thereof is described in U.S. Pat. No. 2,882,243, the disclosure of which is incorporated herein by reference. Zeolite N-A and the conventional preparation thereof is described in U.S. Pat. No. 3,306,922, the disclosure of which is incorporated herein by reference. Zeolite ZK-4 and the conventional preparation thereof is described in U.S. Pat. No. 3,247,195, the disclosure of which is incorporated herein by reference. Zeolite X and the conventional preparation thereof is described in U.S. Pat. No. 2,882,244, the disclosure of which is incorporated herein by reference. Zeolite Y and the conventional preparation thereof is described in U.S. Pat. No. 3,130,007, the disclosure of which is incorporated herein by reference. Zeolite ZK-5 and the conventional preparation thereof is described in U.S. Pat. No. 3,247,195, the disclosure of which is incorporated herein by reference. Zeolite rho and the conventional preparation thereof is described in U.S. Pat. No. 3,904,738, the disclosure of which is incorporated herein by reference.

The use of zeolites having sodalite substructures and having a tetrahedra atom density of less than about $TO_2$ per 1000 $Å^3$ as a source of alumina in the reaction mixture allows production of high purity crystalline molecular sieves or zeolites. Due to the relatively low hydrothermal stability of the source the crystalline product zeolites form relatively rapidly, which allows for the formation of small crystal systems compared with reactions using the same templates and the products obtained using normal or prior art zeolite preparations.

The term "sodalite substructures" used herein means a truncated octahedron having 36 edges, vertices, 6 square faces, and 8 hexagonal faces with a tetrahedral atom located at each vertex. Oxygen atoms are located between the tetrahedral atoms but not necessarily on the edge.

Tetrahedra atom densities for various zeolitic structures is given in more detail in "Zeolite Molecular Sieves" by D. W. Breck (1984), the disclosure of which is incorporated herein by reference.

The use of zeolites having sodalite substructures and which have a tetrahedra atom density of less than 15 $TO_2$ per 1000 $Å^3$ allows a relatively smaller concentration of the organic template to be present in the reaction mixture. Because one can use lower amounts of the template, and because the source zeolite may be used in the ammonium form as well as the alkali metal form and preferably the sodium form or as mixtures thereof, lower cost crystalline zeolites may be obtained.

While not intending to be limited to theory, it is believed that zeolites containing sodalite substructures and which have a tetrahedra atom density of less than about $TO_2$ per 1000 $Å^3$, may contribute from within its structure the correct aluminosilicate building units which can be used to prepare a number of high silica zeolites. By utilizing the highly porous aspects of the source zeolite's structure, and in the presence of quaternary organic ammonium cations, the source zeolite can be converted into a new three-dimensional zeolite structure.

The sources of alkali metal oxide used in accordance with the invention may be, for example, sodium, lithium or potassium hydroxides, oxides, carbonates, halides (e.g. chlorides and bromides), sulfates, nitrates, acetates, silicates, aluminares, phosphates, and salts of carboxylic acids.

In producing a targeted zeolite product, the template used should be of the type normally used in the preparation of the zeolite. Routine experimentation within the broadly defined parameters may be necessary. The sources of the organic template cations, depending on the particular zeolite product to result from crystallization from the reaction mixture may be primary, secondary or tertiary amines or quaternary ammonium compounds. Preferably, the template is a quaternary ammonium compound. Most preferably, the organic template is a cyclic or polycyclic tetra alkylammonium compound wherein the $N^+$ is incorporated into or attached directly to the ring. In addition to quaternary ammonium cations, other types of templates which are soluble and stable under basic pH conditions may be used in this reaction mixture. Non-limiting examples of suitable cations appear in Table III.

Typical sources of silicon oxide include silicates, silica hydrogel, silicic acid, colloidal silica, fumed silicas, tetraalkyl orthosilicates, and silica hydroxides.

Typical sources of aluminum oxide for the reaction mixture, which may be used but are not required, include alumninates, alumina, and aluminum compounds, such as aluminum coated silica colloids.

In calculating the mole ratio of hydroxide ions/silica, it is conventional to calculate hydroxide by summing moles of $OH-$, whether added as NaOH, as quaternary ammonium hydroxide, as sodium silicate ($NaOH + SiO_2$), as sodium aluminate ($NaOH + Al_2O_3$), or the like, and to subtract therefrom the sum any moles of acid added. Acid may be added simply as HCl, $HNO_3$, $H_2SO_4$, acetic acid, and the like or it may be added as an aluminum sulfate ($Al_2O + H_2SO_4$), chloride ($Al_2O_3 + HCl$), nitrate ($Al_2O_3 + NHO_3$), etc. In particular, no contribution is assigned to organic bases such as amines in this calculation.

Although the usefulness of this invention is to be found with quaternary ammonium cations at $OH/SiO_2$ ratios below those recognized in the prior art, it is with the amines that this invention is ideally suited. Amines present in reaction mixtures having an $OH-/SiO_2$ ratio of 0.01 are protonated when further acid is added. Until said additional acid exceeds the amine present, the pH remains above 7.

In a conventional calculation which does not consider amines, the total moles of acid could thereby exceed the moles of hydroxide added in said reaction mixture and subtraction would thereby lead to apparent "negative" $OH-/SiO_2$ ratios. A negative ratio is, of course, not possible since the true moles of hydroxide (per liter) in an aqueous mixture are always positive and equal to $10^{-14}$ divided by the moles per liter of acid. Maintaining the convention which has been established in describing reaction mixture compositions, we define the quantity of acid added in excess of the hydroxide added by the ratio $H+$(additional)/$SiO_2$ and, recognizing the impossibility of negative $OH-/SiO_2$ ratios, the $OH-/SiO_2$ ratio was arbitrarily assigned to a value of zero.

The casual experimenter must be cautioned that, as will be well known to those skilled in the art of zeolite crystallization, not all possible combinations within a broadly defined composition range will be equally effective. Some combinations will indeed be unsuccessful or impractical.

Reaction conditions include heating the reaction mixture to a temperature that is from about 70° C. to 300° C. for a period of time that is from about 1 hour to 180 days. Preferably, the temperature is from about 120° C. to about 270° C. During the crystallization of the zeolites, the reaction mixture may be stirred or allowed to crystallize without the use of agitation, if desired. Additionally, if desired, seed crystals of the desired zeolite my be added to the reaction mixture.

The zeolites prepared by the present improved method may be used for organic compound conversion in the hydrogen form or they may be base exchanged or impregnated to contain ammonium or a metal cation complement. It is desirable to calcine the catalyst after base exchange. The metal cations that may be present include any of the cations of the metals of Groups I through VIII of the Periodic Chart of the Elements especially rare earth metals. However, in the case of Group 1A metals, the cation content should in no case be so large as to effectively inactivate the catalyst.

As in the case of many catalysts, it is desirable to incorporate the improved catalyst prepared by the present improved method with another material resistant to the temperature and other conditions employed in some organic compound conversion processes. Such matrix materials include active and inactive materials and synthetic or naturally occurring zeolites as well as inorganic material such as clays, silica and/or metal oxides. The latter may be either naturally occurring or in the form of gelatinous precipitates, sols or gels including mixtures of silica and metal oxides. Inactive materials suitably serve as diluents to control the amount of conversion in a given process so that products can be obtained economically and orderly without employing other means for controlling the rate of reaction. Frequently, zeolite materials have been incorporated into naturally occurring clays, e.g. bentonite and kaolin. These materials, i.e. clays, oxides, etc., function, in part, as binders for the catalyst. It may be desirable to provide a catalyst having good crush strength so it my be used in a process where the catalyst is subjected to rough handling, such as in a fluidized system, which may tend to break the catalyst down into powder-like materials which cause problems in processing.

Naturally occurring clays which can be composited with the improved zeolites prepared hereby include the montmorillonite and kaolin families, which include the sub-bentonites and the kaolins commonly known as Dixie, McNamrnee, Georgia and Florida clays or others in which the main mineral constituent is halloysite, kaolinire, dickire, nacrite or anauxite. Such clays can be used in the raw state as originally mined or initially subjected to calcination, acid treatment or chemical modification.

In addition to the foregoing materials, the zeolites made hereby can be composited with one or more porous matrix materials such as alumina, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel. A mixture of these components, one with the other and/or with a clay, could also be used. The relative proportions of zeolite and inorganic oxide gel matrix and/or clay vary widely with the crystalline aluminosilicate content ranging from about 1 to about 90 percent by weight and more usually in the range of about 2 to about 50 percent by weight of the composite.

Zeolites prepared by the present improved method are valuable catalysts or catalyst components in various organic compound conversion processes, e.g. hydrocarbon compound and oxygenate, such as methanol, conversion processes. Such processes include, for example, alkylation of aromatics with olefins; aromatization of normally gaseous olefins and paraffins; aromatization of normally liquid low molecular weight paraffins and olefins; isomerization of aromatics, paraffins and olefins; disproportionation of aromatics; transalkylation of aromatics, oligomerization of olefins; cracking and hydrocracking. All of the foregoing catalytic processes are of value since they result in upgrading of the organic charge being processed.

The process for upgrading reformates wherein a zeolite prepared in accordance herewith is employed as catalyst generally involves contact during processing with a reformate or reformer effluent, with or without added hydrogen, at a temperature between 500° F. and about 1100° F. and preferably between about 550° F. and about 1000° F. The reaction pressure in such operation is generally within the range of about and about 2000 psig and preferably about 50 to about 1000 psig. The liquid hourly space velocity, i.e. the liquid volume of hydrocarbon per hour per volume of catalyst, is between about 0.1 and about 250. and preferably between about 1 and 100. Although hydrogen is not essential to this process, when it is used the molar ratio of hydrogen to hydrocarbon charge employed is between about 0.1 and about 80 and preferably between about 1 and about 10.

Oligomerization of olefins, i.e. olefins having 2 to 10 carbon atoms, is effectively carried out with the zeolite prepared in accordance herewith as catalyst. Such reaction is suitably effected at a temperature between about 550° F. and about 1150° F., a pressure between about 0.01 and about 1000 psig and a weight hourly space velocity within the approximate range of 0.1 to 1000.

Alkylation of aromatic hydrocarbons, e.g. benzene, with an alkylating agent such as an alkyl halide, an alcohol or an olefin, is also readily effected in the presence of the presently made zeolite as catalyst with reduced aging.

Alkylation conditions include a temperature between about 400° F. and about 1000° F., a pressure between about and about 1000 psig, an aromatic hydrocarbon-/alkylating agent mole ratio of 2 to 200 and an alkylating agent weight hourly space velocity within the approximate range of 0.5 to 50.

Xylene isomerization is another reaction suitably conducted in the presence of the zeolite made in accordance herewith as catalyst. Isomerization conditions include a temperature between about 300° F. and about 900° F., a pressure between about and about 1000 psig and a weight hourly space velocity within the approximate range of 0.2 to 100.

Aromatics, such as, for example, toluene, Nay be disproportionated in the presence of the presently made zeolite under a temperature of from about 450° F. to about 1100° F., a pressure of from about 50 psig to about 800 psig and a liquid hourly space velocity within the approximate range of about 0.1 to about 20. Aliphatic hydrocarbons may also be disproportionated in the presence of zeolite prepared by the present improved method at a temperature of from about 350° F. to about 900° F., a pressure between 0 and 3,000 psig and a liquid hourly space velocity of between about 0.01 and about 5.

When the conversion of organic compounds with the presently made zeolite as catalyst is cracking, catalytic conversion conditions should be maintained within certain ranges, including a temperature of from about 700° F. to about 1200° F., preferably from about 800° F. to about 1000° F., a pressure of from about atmospheric to about 200 psig, and a liquid hourly space velocity of from about 0.5 hr$^{-1}$ to about 50 hr$^{-1}$, preferably from about 1 hr$^{-1}$ to about 10 hr$^{-1}$. When the conversion is hydrocracking, catalytic conversion conditions should be maintained within somewhat different ranges, including a temperature of from about 400° F. to about 1000° F., preferably from about 500° F. to about 850° F., a pressure of from about 500 psig to about 3500 psig, a liquid hourly space velocity of from about 0.1 hr$^{-1}$ to about 10 hr$^{-1}$, preferably from about 0.2 hr$^{-1}$ to about 5 hr$^{-1}$, and a hydrogen/hydrocarbon ratio of from about 1000 scf/bbl to about 20,000 scf/bbl, preferably from about 3,000 scf/bbl to about 10,000 scf/bbl.

It may be desirable in some instances to add a hydrogenation/dehydrogenation component to the zeolites prepared in accordance herewith. The hydrogenation/dehydrogenation component employed is not critical and can range from about 0.01 to about 30 weight percent based on the entire catalyst. A variety of hydrogenation components may be combined with either the zeolite and/or matrix in any feasible manner which affords intimate contact of the components, employing well known techniques such as base cogellation, mechanical admixture of one component with the other and the like. The hydrogenation component can include metals, oxides and sulfides of metals of the Periodic Chart of the Elements (Fisher Scientific Company, Cat. No. 5-702-10, 1978) which fall in Group VIA including chromium, molybdenum, tungsten and the like; Group IIB including zinc and cadmium; Group VIII including cobalt, nickel, platinum, palladium, ruthenium, rhodium, osmium and iridium; Group IVB such as germanium and tin and combinations of metals, sulfides and oxides of metals of Group VIA and VIII, such as nickel-tungsten-sulfide, cobalt oxide-molybdenum oxide and the like. Pre-treatment before use varies depending on the hydrogenation component present. For example, with components such as nickel-tungsten, cobalt-molybdenum, platinum and palladium, the catalyst may desirably be sulfided. With metals like platinum or palladium, a hydrogenation step may also be employed. These techniques are well known in the art and are accomplished in a conventional manner.

The above descriptions and particularly, the examples are set forth for purposes of illustration only and are not meant to limit the invention to any theories, but instead is limited to what is claimed herein. Many variations and modifications thereof will be apparent to those of ordinary skill in the art and can be made without departing from the spirit and scope of the invention herein described.

EXAMPLE 1

In this example, the zeolite Beta was prepared in accordance with the present invention. 0.50 g sodium Y zeolite (obtained as Y-52 from Union Carbide Corporation) was added to 8 mL H$_2$O 0 4.00 g 1M NaOH, and 5 grams of Banco sodium silicate. These components were combined in a Teflon liner of a Parr 4749 pressure reactor. Three millimoles of the organic template A36 (identified in Table III) was added to the mixture and the reactor was sealed and heated for 5 days at 130° C. with 45 rpm agitation. Upon cooling, the product is recovered by filtration and dried after several washings. X-ray diffraction indicated the product to be Beta zeolite.

EXAMPLE 2

In this example, the zeolite SSZ-37 was prepared in accordance with the present invention. 4.5 grams of a 0.66M solution of template B71, 2.01 grams of water, and 0.76 grams of 1N NaOH are added to a teflon cup of a Parr 4745 reactor. 0.74 grams of Cabosil M5 is blended int the solution, followed by the additions of 0,253 of LZ-210 zeolite. The reaction was heated to 160° C. and rotated at 43 rpm on a spit in a Blue M oven. After days a settled product was obtained, and the reaction was filtered, washed repeatedly, and dried to give 0.867 grams of product which was determined by X-ray diffraction to be SSZ-37.

EXAMPLES 3–5

Using the general procedure outlined below, various zeolites are prepared as shown in Tables II. The templates used in the Examples are specifically described in Table III. Table I shows the properties of various source zeolite materials considered.

1.5 millimoles of the identified organic template are mixed with 7 ml of H$_2$O and 1.5 mm NaOH. 0.72 g Cabosil is added in and 0.28 grams of the identified source zeolite is added as an aluminum source. The SiO$_2$/Al$_2$O$_3$ ratio is 35. The mixture is heated to 170° C. for 6 days at 43 rpm. The recovered products are as identified.

TABLE I

| Source Zeolites | |
|---|---|
| Zeolite | Framework Density (g/cc$^a$) |
| A | 1.27 |
| N-A | 1.3 |
| ZK-4 | 1.3 |
| Faujasite | 1.27 |
| X | 1.31 |
| Y | 1.25–1.29 |
| ZK-5 | 1.46 |
| RHO | 1.45 |

$^a$The framework density is based on the dimensions of the unit cell of the hydrated zeolite and framework contents only. Multiplication by 10 gives the density in units of tetrahedra/1000 Å$^3$.

TABLE II

| Example No. | Organo Cation | Source Zeolite | Temp. | Product |
|---|---|---|---|---|
| 3 | B57 | LZ-210 | 160 | SSZ-25 + |
| 4 | B27 | Y52 | 160 | ZSM-12 |
| 5 | M46 | Y52 | 160 | ZSM-12 |

TABLE III

Organic Template Cations

A15

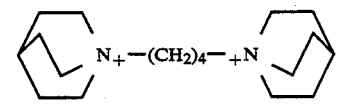

TABLE III-continued

Organic Template Cations

A36 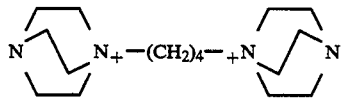

B09 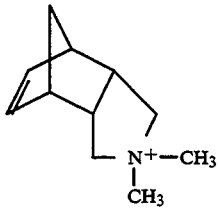

B14 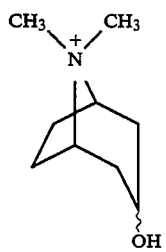

B19 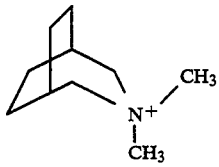

B27 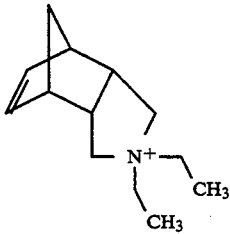

B36 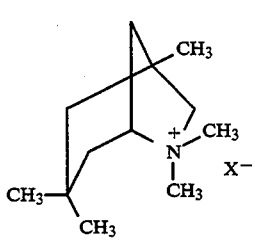

B57 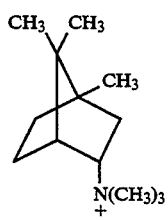

M46 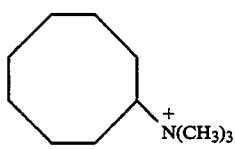

L28 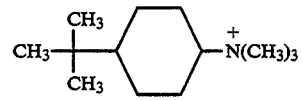

T06 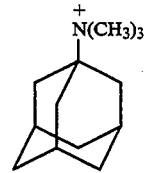

G16 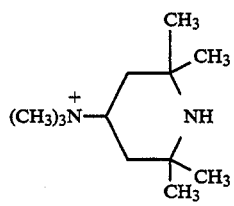

The cracking activity of the products of the present invention can be demonstrated to be very high and improvements over prior methods. Examples 6 and 7 show the cracking of a 50/50 n-hexane/3 methylpentane (vol/vol) mixture run at atmospheric pressure in a downflow reactor with helium carrier gas. The helium to feed ratio was 6. The test was run at 0.68 WHSV$^{-1}$ using 20–40 mesh catalyst chips. Catalysts are dried to 1000° F. before being run at the temperature described in Table VI.

The preparation of catalysts consists of calcining the as-made organo-zeolite to 1100° F. in air. Four ion-exchanges a using ~1 molar NH$_4$NO$_3$ (50 cc/gm Zeolite) are carried out for 2 hours each at 100° C. The dried NH$_4$+ zeolite is then treated as described in the preceding paragraph.

TABLE VI

| Example No. | Zeolite | Temp. | Conv. % | Time |
|---|---|---|---|---|
| 6 | Beta | 500° F. | 79.6 | 40 Min. |
| 7 | Beta$^b$ | 500° F. | 50 | 40 Min. |

$^b$This beta zeolite was prepared by the prior art method (U.S. Pat. No. 3,308,069) and was treated for catalyst preparation just as Example 6. The SiO$_2$/Al$_2$O$_3$ for this material was typically around 27.

What is claimed is:

1. A method for preparing crystalline aluminosilicate zeolites SSZ-25, SSZ-31, SSZ-37, Beta and ZSM-12, said method comprising:

(a) preparing a reaction mixture containing a source zeolite, wherein said source zeolite contains sodalite substructures and has a tetrahedra atom density of less than about 15 TO$_2$ per 1000 Å$^3$, an alkali metal oxide, an organic template capable of forming said aluminosilicate zeolite, a source of silica, and water, and having a composition in terms of mole ratios of oxides falling within the following ranges:

$$M^+/SiO_2 = 0.01–1.00$$
$$OH/SiO_2 = 0.15–0.80$$
$$H_2O/SiO_2 = 20–120$$
$$Q/SiO_2 = 0.10–1.00$$

-continued

| | | |
|---|---|---|
| $SiO_2/Y_2O_3$ | = | Greater Than 8 | wherein $M^+$ is an alkali metal not supplied by the source zeolite, Q is said organic template and is selected from cyclic or polycyclic tetraalkylammonium compounds having the $N^+$ incorporated into or attached directly to the ring, and Y is aluminum from the source zeolite, and (b) maintaining said reaction mixture at crystallization temperature until crystals are formed, wherein said crystals have a pore size greater than 7 Å; and (c) recovering said crystals.

2. The method in accordance with claim 1, wherein said reaction mixture contains an additional alumina source not supplied by the source zeolite.

3. The method in accordance with claim 1, wherein said source zeolite is selected from the group consisting of zeolites A, N-A, ZK-4, faujasite, X, Y, ZK-5 and rho.

4. The method in accordance with claim 1, wherein said crystals have a silica-to-alumina mole ratio less than about 20.

5. The method in accordance with claim 1, wherein said crystals have a silica-to-alumina mole ratio from about 10 to less than about 20.

6. The method of claim 1, wherein said crystals have a silica-to-alumina mole ratio from about 14 to less than about 20.

7. The method in accordance with claim 1, wherein said source zeolite has a silica/alumina mole ratio from about 2 to about 20.

8. The method in accordance with claim 6, wherein said source zeolite has a silica/alumina mole ratio from about 5 to about 10.

9. A method for preparing synthetic zeolites SSZ-37 and Beta, said method comprising:

(a) preparing a reaction mixture containing a source zeolite, wherein said source zeolite contains sodalite substructures and has a tetrahedra atom density of less than about 15 $TO_2$ per 1000 Å$^3$, an alkali metal oxide, an organic template capable of forming said zeolite SSZ-37 or Beta, a source of silica, and water, and having a composition falling within the folllowing ranges:

| | | |
|---|---|---|
| $M^+/SiO_2$ | = | 0.01–1.00 |
| $OH^-/SiO_2$ | = | 0.15–.80 |
| $H_2O/SiO_2$ | = | 20–120 |
| $Q/SiO_2$ | = | 0.10–1.00 |
| $SiO_2/Y_2O_3$ | = | Greater than 8 | wherein $M^+$ is an alkali metal not supplied by the source zeolite, Q is said organic template and is selected from cyclic or polycyclic tetraalkylammonium compounds having the $N^+$ incorporated into or attached directly to the ring, and Y is aluminum from the source zeolite, and (b) maintaining said reaction mixture at crystallization temperature until crystals are formed; and (c) recovering said crystals.

10. The method in accordance with claim 9, wherein said reaction mixture contains an additional source of alumina.

11. The method in accordance with claim 11, wherein said source zeolite is selected from the group consisting of zeolites A, N-A, ZK-4, faujasite, X, Y, ZK-5 and rho.

12. The method of claim 11, wherein said source zeolite is selected from the group consisting of zeolites A, X, Y, and rho.

13. The method in accordance with claim 1 or 9, wherein said organic template is selected from the group consisting of A15
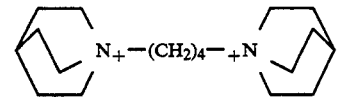

A36
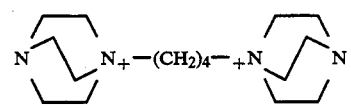

B09
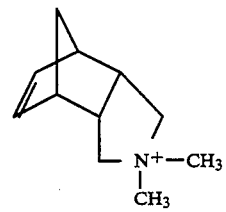

B14
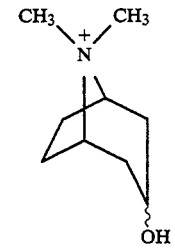

B19
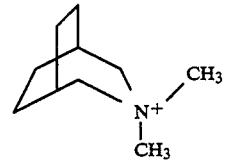

B27
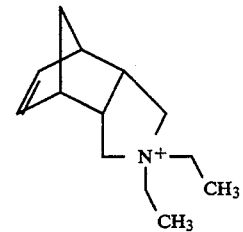

B36
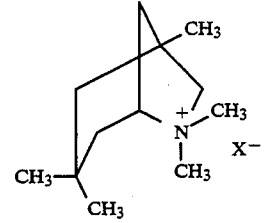

B57 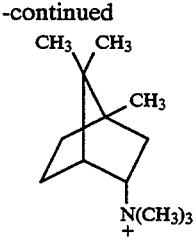
M46 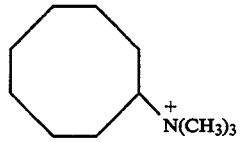
L28 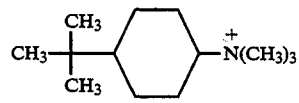
T06 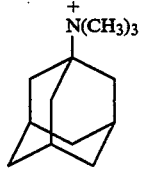
G16 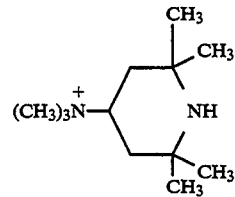
14. The method in accordance with claim 1 or 9, wherein said source zeolite is in the sodium or ammonium form.
* * * * *